United States Patent [19]
Chapman

[11] Patent Number: 5,176,401
[45] Date of Patent: Jan. 5, 1993

[54] TELESCOPING COLUMN

[75] Inventor: Leonard T. Chapman, Hollywood, Calif.

[73] Assignee: Leonard Studio Equipment, Inc., North Hollywood, Calif.

[21] Appl. No.: 686,823

[22] Filed: Apr. 17, 1991

Related U.S. Application Data

[63] Continuation-in-part of Ser. No. 591,525, Oct. 1, 1990.

[51] Int. Cl.⁵ .................................................. B62D 1/18
[52] U.S. Cl. ................................... 280/775; 248/132; 280/47.11
[58] Field of Search ............... 248/125, 161, 157, 332, 248/328, 333, 669, 162.1, 132; 352/243; 354/81; 280/47.11, 638, 775

[56] References Cited

U.S. PATENT DOCUMENTS 4,095,250  6/1978  Giglioli ........................ 280/47.11 X
4,657,267  4/1987  Jaumann et al. ................... 354/81 X
4,697,773  10/1987  Jaumann et al. ............. 248/162.1 X Primary Examiner—Ramon O. Ramirez
Attorney, Agent, or Firm—Lyon & Lyon

[57] ABSTRACT

A telescoping steering column includes a plurality of telescoping segments with adjacent segments axially offset from each other. Spacers maintain the segments in position. Cable and pulley systems on each of the segments, except the innermost segment, interconnect the segments and cause them to uniformly extend and retract as the column is raised or lowered. The pulleys protrude through the segment walls. Pulleys on adjacent segments are oriented on opposite sides of the column, to provide a compact column which operates smoothly and quietly.

16 Claims, 5 Drawing Sheets

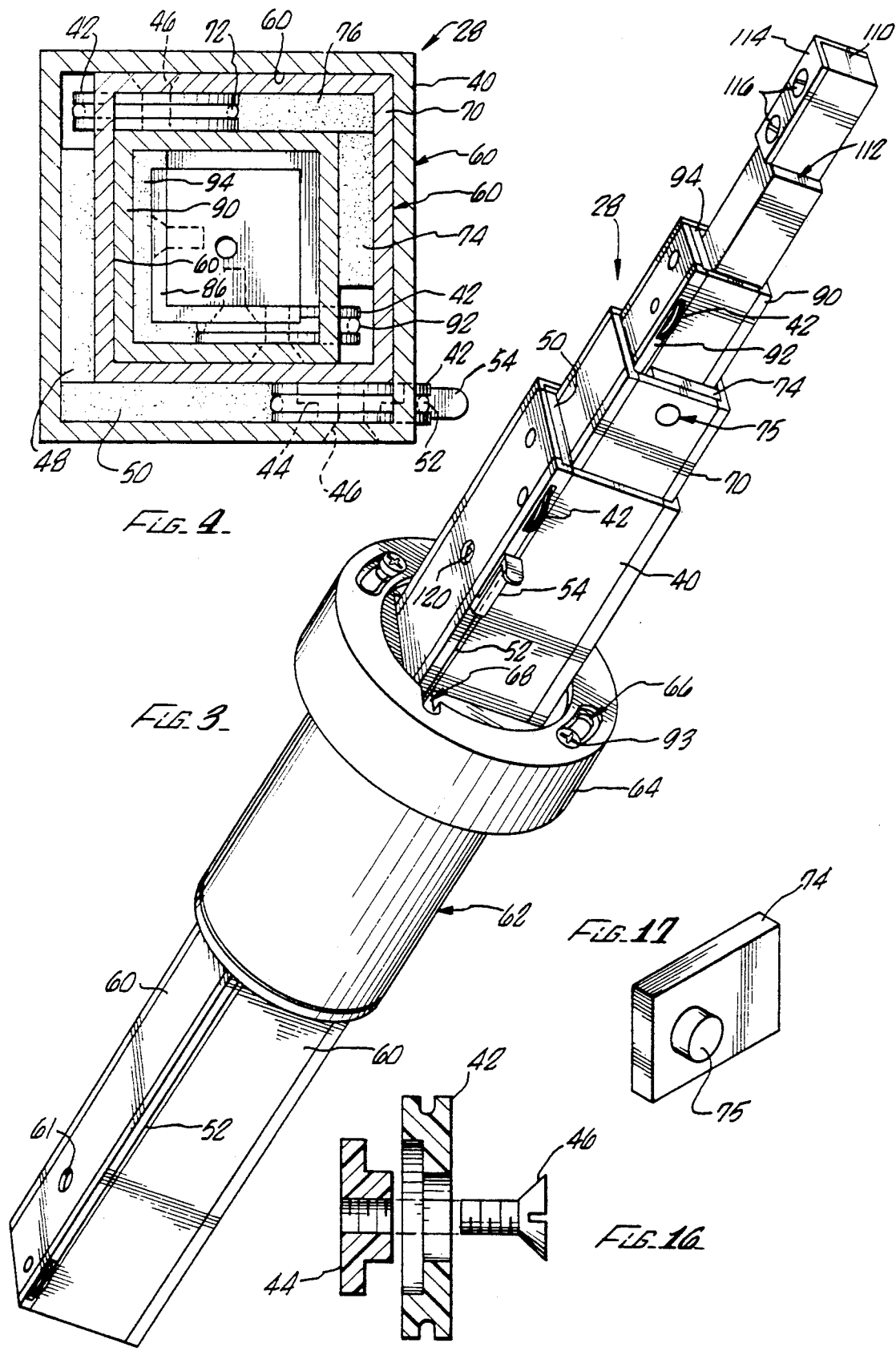

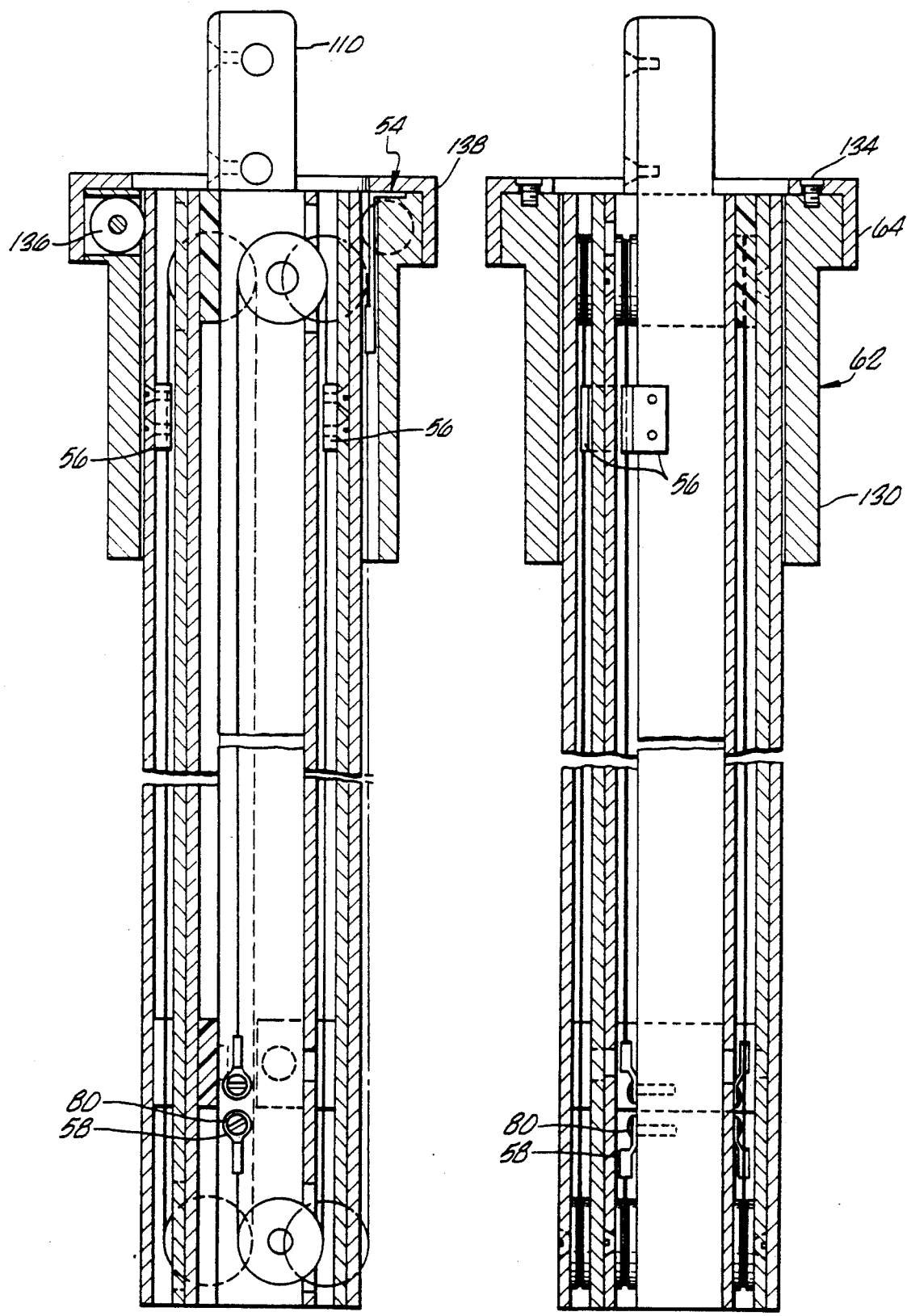

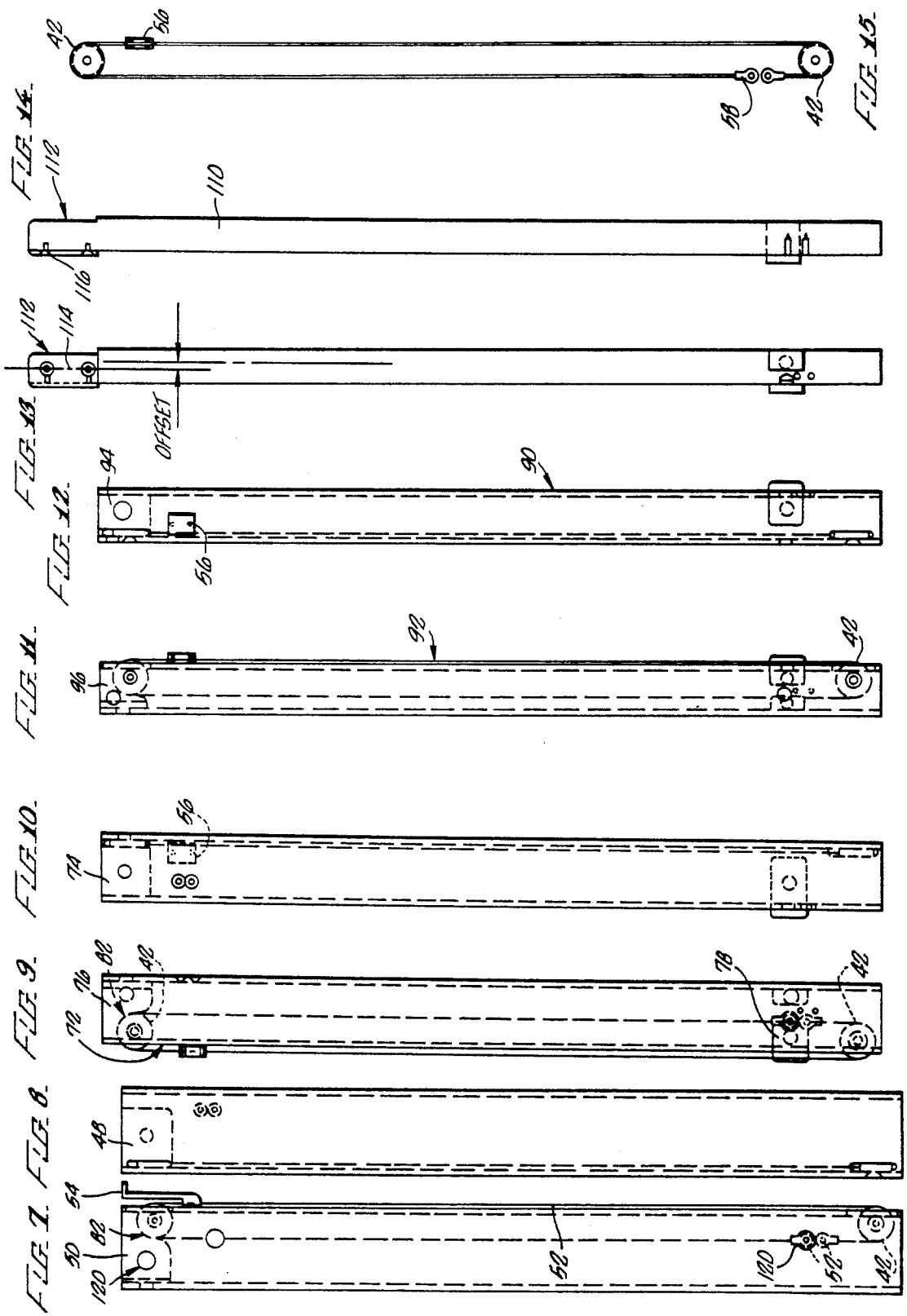

5,176,401

TELESCOPING COLUMN

This is a continuation-in-part application of my earlier application entitled "Camera Dolly", filed Oct. 1, 1990, Ser. No. 591,525 now pending. Ser. No. 591,525, and my related application Ser. No. 591,524 now allowed of the same date are hereby incorporated in full into this application by reference.

BACKGROUND OF THE INVENTION

The field of the invention is telescoping columns.

In various applications, telescoping columns are required for positioning or holding functions, or to transmit forces or torque. In camera support equipment in particular, it is important that telescoping columns used to support a camera or to transmit torque from a steering wheel to a steering system, operate smoothly and quietly. It is also desirable that the telescoping column extend and retract with a minimum amount of frictional drag. The telescoping column should also be lightweight and compact yet have a long extension range or reach, and a polar moment of inertia sufficiently high to transmit applied torques.

Various telescoping columns have been known and used in the past, and have met with varying degrees of success, in camera supports and other mechanical equipment. However, these known telescoping columns may be too large, heavy or bulky, or lack the desirable smooth and quiet operation necessary for camera support and other types of equipment.

Accordingly, it is an object of the invention to provide an improved telescoping column which is exceptionally compact and lightweight.

It is yet another object of the invention to provide such a telescoping column which has a long extension even though compact in size.

It is another object of the invention to provide such a telescoping column which has column tubes or segments which uniformly, quietly, and smoothly extend and retract.

It is another object of the invention to provide such a telescoping column which can transmit steering torque in a camera support.

It is yet another object of the invention to provide such a telescoping column which is quickly and easily installed and removed from a camera support.

SUMMARY OF THE INVENTION

To these ends, a telescoping column includes a second segment slidably disposed within a first segment, a third segment slidably disposed within the second segment, and a fourth segment slidably disposed within the third segment. Preferably, the first, second and third segments are hollow, square, aluminum tubes and the fourth segment is a solid bar.

The first segment or tube has an upper and lower pulley adjacent either end, with a cable loop running over the pulleys.

A tab attached to the first cable loop, on the outside of the first segment, is held within a slot in a drive hub by a retainer cap at the base of the column. A sprocket within the dolly chassis is joined to the drive hub, for actuating the dolly steering system. Screws which pass through slots in the retainer cap can be loosened so the retainer cap can be turned from a release position (wherein the tab can pass out of the hub for removing the column) to a holding position (wherein the tab is held within the slot in the hub) for ordinary operation. A set of four rollers guides the first segment as it extends and retracts from the hub. The set of rollers also allows the telescoping column to be angled or tilted slightly, if necessary, to obtain alignment so it can link up to the receptacle in the steering wheel belt system.

Eyelets on the first cable loop are attached to the lower end of the second segment, which is diagonally offset from the first segment. Spacers maintain the position of the second segment within the first segment. Low friction tape is provided on the outside surfaces of all of the segments to facilitate smooth sliding. Assembly or access holes are provided in the segment to allow the eyelets of each cable loop to be fastened to their adjacent inner segment.

The third segment or tube is positioned within and offset from the second segment, such that the third segment axially aligns with the first segment. Spacers again maintain the offset alignment between the third segment and the second segment. A second cable loop passing over pulleys on the second segment has a crimp plate attached to the second segment and eyelets attached to the third segment.

A fourth segment is slidably disposed within and diagonally offset from the third segment. The fourth segment is offset with respect to the third segment in the same direction as the second segment is offset from the first segment. A third cable loop positioned on pulleys on the third cable segment has eyelets attached to the lower section of the fourth segment. An upper section of the fourth segment or bar is relieved or cut away on two surfaces. An angle plate is attached to the opposite two surfaces, so that the square shape of the upper end of the fourth segment is brought into alignment with the first segment. This allows the telescoping column to align with square socket receptacles in the steering wheel belt system and dolly belt system, in a camera support.

The offsetting of the segments relative to each other provides space for the cable and pulley systems, while maintaining relatively small outside dimensions. The interattachment of the cable loops causes the segments to extend uniformly as the innermost or fourth segment is pulled up or pushed down. The pulleys on each segment protrude partially outside of the segment wall, such that the cable loops run within and without of the segments.

In addition, the offsets and protruding pulleys allow relatively large diameter pulleys to be used. This reduces their speed of rotation and contributes to quiet operation.

Other objects and features of the invention will appear in the following disclosure.

BRIEF DESCRIPTION OF THE DRAWINGS

In the drawings, wherein similar reference characters denote similar elements, throughout the several views:

FIG. 3 is a perspective view of the present telescoping column;

FIG. 4 is an enlarged top view thereof;

FIG. 5 is a front section view thereof;

FIG. 6 is a side section view thereof;

FIG. 7 is a front elevation view of the first segment of the column;

FIG. 8 is a side view thereof;

FIG. 9 is a front elevation view of the second segment of the column;

FIG. 10 is a side view thereof;

FIG. 11 is a front elevation view of the third segment of the column;

FIG. 12 is a side view thereof;

FIG. 13 is a front view of the fourth segment of the column;

FIG. 14 is a side view thereof;

FIG. 15 is a front elevation view of a cable loop;

FIG. 16 is a section view of a typical pulley; and

FIG. 17 is a perspective view of a typical spacer interposed between the column segments.

DETAILED DESCRIPTION OF THE PREFERRED EMBODIMENTS

Figure 1:
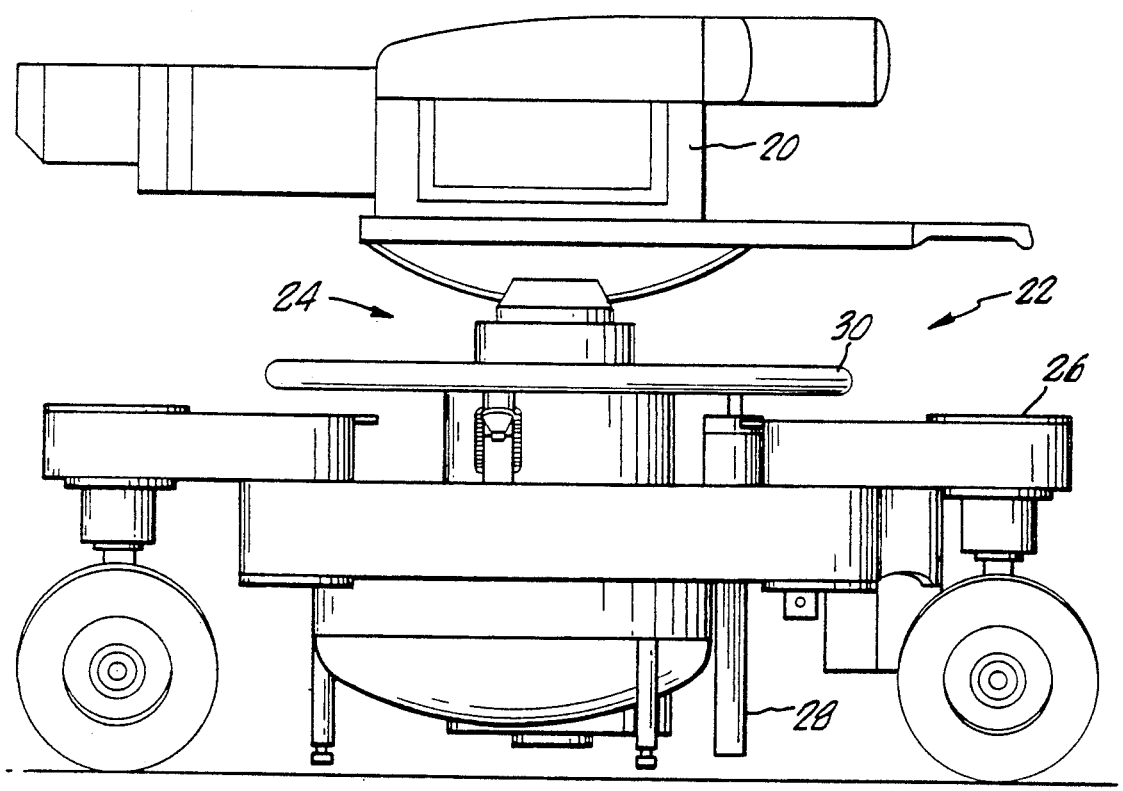
FIG. 1 is a side elevation view of a camera support.
Figure 2:
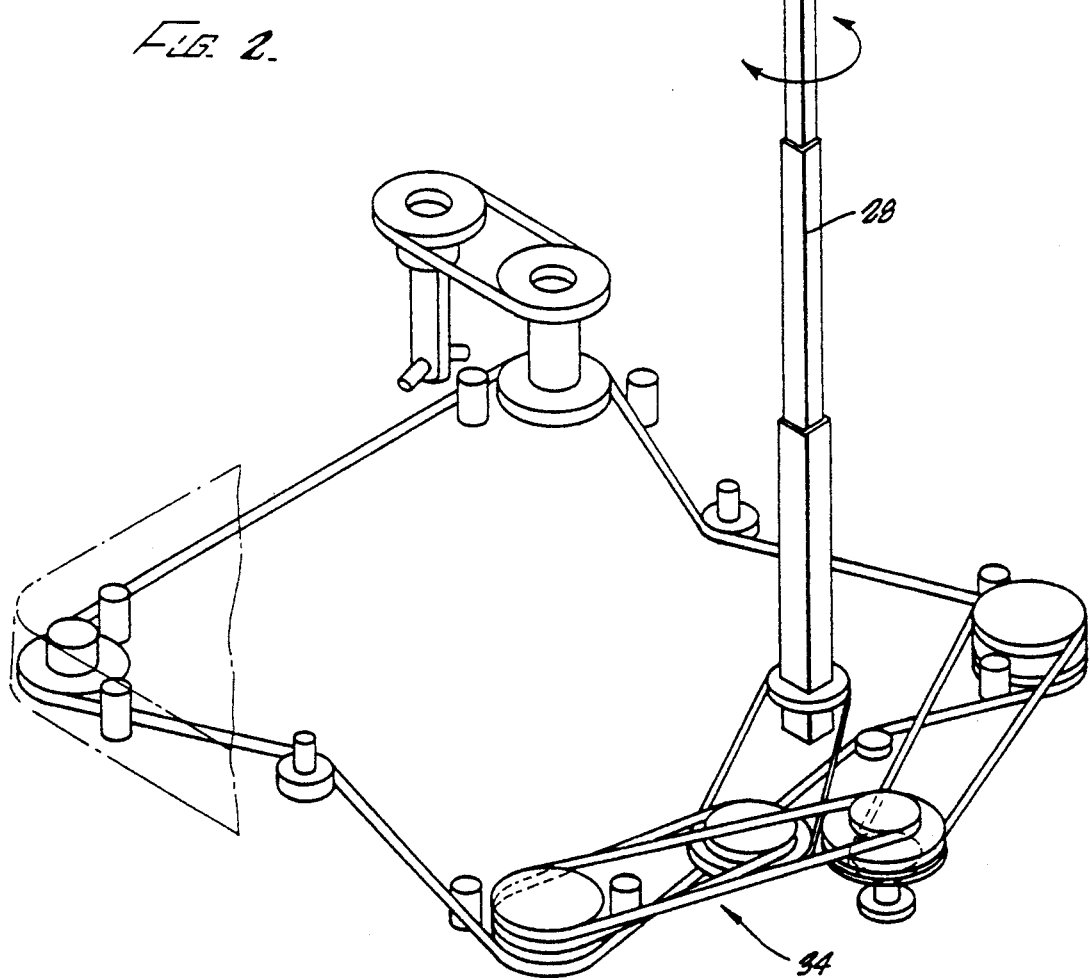
FIG. 2 is a schematic illustration of the present telescoping column interconnecting a steering wheel belt system to a dolly belt system in a camera support.

FIGS. 1 and 2 illustrate a camera support 22 for supporting a camera 20. The camera support 22 includes a pedestal 24 and a dolly 26. The pedestal 24 has a steering wheel linked to a steering wheel belt system 32. The steering wheel belt system 32 mechanically drives a dolly belt system 34 in the dolly 26 through a telescoping steering drive column 28. A detailed description of the pedestal 24 and dolly 26 and their belt systems is provided in my earlier co-pending patent application Ser. Nos. 591,524 and 591,525, both filed Oct. 1, 1990.

Turning to FIG. 3, the telescoping column 28 includes a first tube 40 having a pulley 42 mounted adjacent to its upper end and another pulley 42 at its lower end. A first cable loop passes over the pulleys 42 on the first tube 40. A tab 54 is secured to the first cable loop 52 on the outside of the first tube 40.

Referring to FIGS. 3, 4, 5 and 6, a second tube 70 is slidably positioned within the first tube 40. As shown in FIG. 4, the second tube 70 is diagonally offset from the first tube 40. Spacers 48 and 50 positioned between the first tube 40 and the second tube 70 maintain the offset positioning.

The second tube 70 also has a pair of spaced apart pulleys 42 with a second cable loop 72 positioned over the pulleys. Referring to FIGS. 5-10, the first cable loop 52 has eyelets 58 attached to the lower end of the second tube 70 by screws 80. Access holes 120 are provided through the first tube 40 for assembly purposes. A third tube 90 is slidably positioned within the second tube 70, and is held in an offset position from the second tube 70 by spacers 74 and 76, as shown in FIG. 4. Eyelets 58 on the second cable loop 72 are attached to the lower end of the third tube 90 by screws 80. A crimp plate 56 attached to the second cable loop 72 is attached to the upper end of the second tube 70.

The third tube 90 also has spaced apart pulleys 42 supporting a third cable loop 92, in a similar manner. A fourth tube or centerbar 110 is slidably positioned in an offset manner within the third tube 90 by spacers 94 and 96. Eyelets 58 on the third cable loop 92 are attached at the lower end of the centerbar 110. A crimp plate 56 secured to the third cable loop 92 is attached to the upper end of the third tube 90.

The top of the centerbar 110 has relieved sections or sides 112 and an angle plate 114 screwed to the opposite two sides of the centerbar 110, to recenter or realign the square cross section of the centerbar 110 with the center of the first tube 40. This compensates for the offset location of the centerbar 110 from the third tube 90, and maintains alignment between the square receptacles in the steering wheel belt system 32 and the dolly belt system 34, as shown in FIG. 2.

The outside surfaces of the first tube 40, second tube 70, third tube 90 and fourth tube or centerbar 110 are covered with a low friction coating or tape 60 made of for example, Delrin or Teflon. Similarly, the spacers 48, 50, 74, 76, and 94 and 96 which hold the tubes and centerbar in position are also preferably made of such a low friction material. The spacers 50, 76 and 96 which are adjacent to pulleys have a radiused or contoured face 82 facing the pulley 42, to prevent the cable loops 52, 72 and 92 from possibly jumping off of the pulleys 42. Although not shown, equivalent spacers may be provided at the lower end of each tube 40, 70 and 90, to similarly prevent the cable loops from possibly jumping off the pulleys 42 at the lower ends. Spacers 78 at the lower ends of the tube maintain the tubes in position and provide low friction lower sliding surfaces.

In FIG. 4, the first, second and third tubes 40, 70 and 90 have been cross hatched for clarity of illustration only. As shown therein, the second tube 70 (preferably a 1.000 inch square) is diagonally offset from the first tube 40 (preferably a 1.25 inch square), such that the first and second tubes slide against each other on two adjacent surfaces, with the low friction tape 60 on the outside surface of the second tube 70 acting to reduce sliding friction.

The offset positioning provides space within the compact dimensions of the first tube 40 for the pulleys 42 and the cable loops. The pulleys 42 protrude through slots in the walls at the upper ends of each of the tubes (the walls are preferably 0.062 inch thick). This allows for attachment of the tab 42 and the crimp plates 56, and also facilitates the use of relatively large pulleys, leading to quieter operation. The third tube 90 (preferably a 0.750 inch square) is diagonally offset from the second tube 70, such that the third tube 90 is aligned with and coaxial with the first tube 40, as shown in FIG. 4. Again, low friction tape 60 acts as a bearing surface between the third tube 90 and the second tube 70, with spacers 74 and 76 maintaining the offset position. The fourth tube or centerbar 110 (preferably a 0.500 inch square) is diagonally offset from the third tube 90 and held in position by spacers 94 and 96.

FIG. 16 shows an enlarged detail of a preferred construction of the pulleys 42 wherein a hub 44 is held within the pulley 42 by a screw 46. FIG. 17 illustrates a typical spacer, such as spacer 74. A boss 75 on the spacer 74 protrudes through a hole 75 (in this case in the second tube 70) to hold the spacers 74 in place.

As shown in FIGS. 3, 5 and 6, the drive collar 62 has a shaft 130 which attaches to a sprocket (not shown) within the dolly belt system 34. A retainer cap 64 covers the upper end of the drive collar 62. Screws 134 pass through slots 164 in the retainer cap 64. The retainer cap has a tab slot 68 through which the tab 54 can pass, when the slot 68 is aligned with the tab 54. A set of four orthogonal rollers 136 at the upper end of the drive collar 62 allows the first tube 40 to roll smoothly into and out of drive collar 62. Rollers 136 are arranged in a square. A tab recess 138 is provided in the drive collar 62 so that the tab 54 can be secured and held in position between the drive collar 62 and the retainer cap 64, when the retainer cap 64 is turned to the retaining position.

In operation, the upper end of the centerbar 110 is placed into a square receptacle fitting in the steering wheel belt system 32 and held there by a set screw. The first tube 40 is passed through the rollers 136 in the drive collar 62, with the tab 54 positioned into the tab recess 138. The retainer cap 64 is turned about the drive collar 62 so that the tab slot 68 no longer aligns with the tab recess 138. This holds the tab 54 in place. The screws 134 optionally may be tightened to further secure the tab 54 into position. With the column 28 so installed, the steering wheel belt system 32 is drivably linked to the dolly belt system 34 as shown in FIG. 2. The column 28 can be quickly and easily removed in the reverse sequence.

As the main column which supports the camera is raised and lowered, (as explained in my earlier referenced applications) the cable loops within the steering drive column 28 cause uniform extension and contraction of the tubes, in a smooth, quiet and relatively dragless manner. Specifically, as the main column supporting the camera is raised, the steering wheel 30 rises and pulls the centerbar 110 up. This causes the third cable loop 92 to pull up the third tube 90. In turn this upward movement of the third tube 90 causes the second cable loop 72 to pull up the second cable loop 72. Again, in turn raising the second tube 70 causes the first cable loop 52 to raise the first tube 40, with all tubes rising by equal amounts. When the camera on the main camera column support is lowered, the same movements occur in the opposite or lowering direction. When the steering wheel 30 is turned to steer the wheels of the dolly 26, the torque applied by the steering wheel belt system 32 is transmitted by the torsional interaction of the tubes of the steering drive column 28, to the rollers 136 and to the drive collar 62 which is linked directly into the dolly belt system 34.

Thus, while a single embodiment has been shown and described, it will be apparent to those skilled in the art that many variations and modifications are possible without departing from the spirit and scope of the present invention.

What is claimed is:

1. A telescoping steering drive column comprising:
a first segment;
a second segment slidably disposed within and offset from said first segment;
spacers positioned between the first and second segments; and
a cable loop linking said first and second segments.

2. The drive column of claim 1 wherein the segments are substantially square in cross section.

3. The drive column of claim 1 wherein the segments are rectangular.

4. The drive column of claim 1 further comprising spaced apart pulleys on the first segment supporting the cable loop.

5. The drive column of claim 1 wherein the spacers positioned between the first and second segments comprise a low friction material.

6. The drive column of claim 1 wherein said cable loop extends both inside and outside of said first segment.

7. The drive column of claim 4 wherein said pulleys extend partially outside of the segment.

8. The drive column of claim 1 further comprising low friction covering applied on outside surfaces of said segments.

9. The drive column of claim 8 wherein the covering is from 0.003 to 0.020 inches thick.

10. The drive column of claim 8 wherein the covering is of a material selected from the group consisting of Delrin and 11. A camera support having a telescoping steering drive column comprising:
a drive collar;
a first segment extending through the drive collar;
a second segment slidably disposed within the first segment and axially offset from the first segment;
a cable loop supported around pulleys on the first segment and attached to the second segment;
a tab secured to the cable loop; and means for attaching the tab to the drive collar.

12. A telescoping steering drive column for mechanically linking a steering wheel belt system to a dolly belt system in a camera support comprising:
a drive collar connected to the dolly belt system;
a first segment having an upper end and a lower end, a first segment centerline, and slidably disposed in the drive collar;
an upper pulley adjacent the upper end of the first segment and a lower pulley adjacent the lower end of the first segment;
a first cable passing over the upper and lower pulleys on the first segment;
a tab on the first cable attachable to the drive collar;
a second segment having a second segment centerline and slidably disposed within the first segment with the centerline of the second segment diagonally offset from the centerline of the first segment in a first direction;
cable ends of the first cable attached to the lower end of the second segment;
spacers between the first and second segments;
an upper pulley adjacent the upper end of the second segment and a lower pulley adjacent the lower end of the second segment, the pulleys on the second segment on a side of the column opposite to the pulleys on the first segment;
a second cable passing over the pulleys on the second segment;
a crimp plate on the second cable attached to the upper en of the second segment;
a third segment having a third segment centerline and slidably disposed within the second segment, with the centerline of the third segment diagonally offset from the centerline of the second segment in a direction opposite to the first direction such that the centerline of the third segment is substantially co-linear with the centerline of the first segment;
cable ends of the second cable attached to the lower end of the third segment;
spacers between the second segment and the third segment;
an upper pulley adjacent the upper end of the third segment and a lower pulley adjacent the lower end of the third segment, the pulleys on third segment positioned on the same side of the column as the pulleys on the first segment;
a third cable passing over the pulleys on the third segment;
a crimp plate on the third cable attached to the upper end of the third segment;
a fourth segment having a fourth segment centerline and slidably disposed within the third segment, with the fourth segment centerline diagonally offset in the first direction;

cable ends of the third cable attached to the lower end of the fourth segment; and spacers between the third segment and the fourth segment.

13. The column of claim 12 wherein the first, second and third segments are square tubes and the fourth segment is a square bar.

14. The column of claim 12 further comprising a top end of the fourth segment having relieved surfaces and an angle plate.

15. The column of claim 12 wherein the pulleys protrude through sidewalls of the segments.

16. The column of claim 12 further comprising a retainer cap over the drive collar for releasably securing the tab.

* * * * *

UNITED STATES PATENT AND TRADEMARK OFFICE
CERTIFICATE OF CORRECTION

PATENT NO. : 5,176,401
DATED : January 5, 1993
INVENTOR(S) : CHAPMAN, LEONARD T.

It is certified that error appears in the above-indentified patent and that said Letters Patent is hereby corrected as shown below:

Column 6,

Claim 10, line 3, after "Delrin and" insert --Teflon.--

Signed and Sealed this

Thirtieth Day of August, 1994

Attest:

BRUCE LEHMAN

*Attesting Officer*          *Commissioner of Patents and Trademarks*